United States Patent
Tonami et al.

(10) Patent No.: US 8,869,388 B2
(45) Date of Patent: Oct. 28, 2014

(54) METHOD OF MANUFACTURING RADIATION TOMOGRAPHY APPARATUS

(75) Inventors: Hiromichi Tonami, Kyoto-fu (JP); Masafumi Furuta, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 703 days.

(21) Appl. No.: 13/003,535

(22) PCT Filed: Jul. 22, 2008

(86) PCT No.: PCT/JP2008/063132
§ 371 (c)(1),
(2), (4) Date: Jan. 10, 2011

(87) PCT Pub. No.: WO2010/010608
PCT Pub. Date: Jan. 28, 2010

(65) Prior Publication Data
US 2011/0113611 A1     May 19, 2011

(51) Int. Cl.
*H05K 3/30*     (2006.01)
*G01R 3/00*     (2006.01)
*G01T 1/20*     (2006.01)
*G01T 1/164*    (2006.01)

(52) U.S. Cl.
CPC ........................... *G01T 1/1644* (2013.01)
USPC .................... 29/832; 29/595; 250/367

(58) Field of Classification Search
CPC ............. H01L 2924/01079; A61B 5/14533; G01T 1/202
USPC ....................... 29/832, 595; 250/367
See application file for complete search history.

(56) References Cited

U.S. PATENT DOCUMENTS

| | | | |
|---|---|---|---|
| 4,945,241 A * | 7/1990 | Yamashita et al. | 250/367 |
| 5,030,830 A * | 7/1991 | Okada | 250/361 R |
| 6,087,663 A * | 7/2000 | Moisan et al. | 250/367 |
| 6,661,867 B2 * | 12/2003 | Mario et al. | 378/57 |
| 6,807,248 B2 * | 10/2004 | Mihara et al. | 378/10 |
| 7,087,905 B2 * | 8/2006 | Murayama et al. | 250/367 |
| 7,142,634 B2 * | 11/2006 | Engler et al. | 378/65 |
| 7,315,027 B2 * | 1/2008 | Okada et al. | 250/370.11 |
| 8,274,055 B2 * | 9/2012 | Ohi et al. | 250/363.07 |
| 8,448,327 B2 * | 5/2013 | Tonami | 29/595 |
| 2005/0087693 A1* | 4/2005 | Sumiya et al. | 250/367 |

FOREIGN PATENT DOCUMENTS

JP        2004-279057 A        10/2004

* cited by examiner

*Primary Examiner* — David Angwin
(74) *Attorney, Agent, or Firm* — Cheng Law Group, PLLC

(57) ABSTRACT

A method of manufacturing radiation tomography apparatus in this invention includes a step of fixing a detector array to a holding member by adjusting relative positions of the detector array and the holding member the base by spacing a scintillator apart from a base through contact of the scintillator of the detector array to a supporting device. Such configuration may realize provision of radiation tomography apparatus with higher spatial resolution by manufacturing a group of detectors having the scintillators of suppressed deviation in arrangement and being arranged regularly upon arranging radiation detectors for forming the group of detectors.

8 Claims, 16 Drawing Sheets

Fig.16
(a)
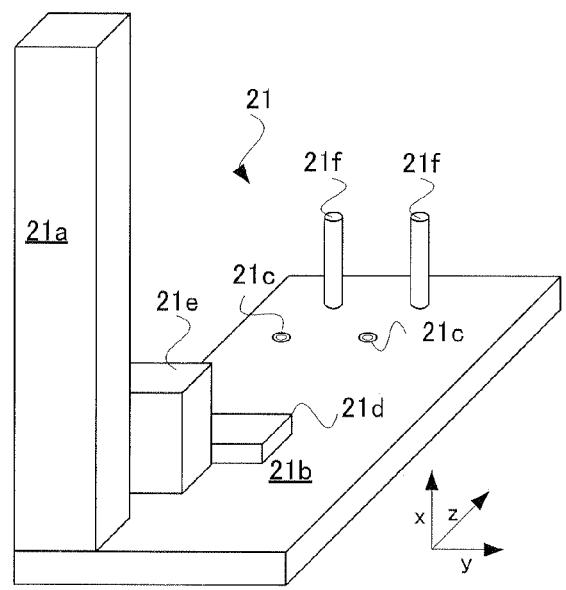
(b)
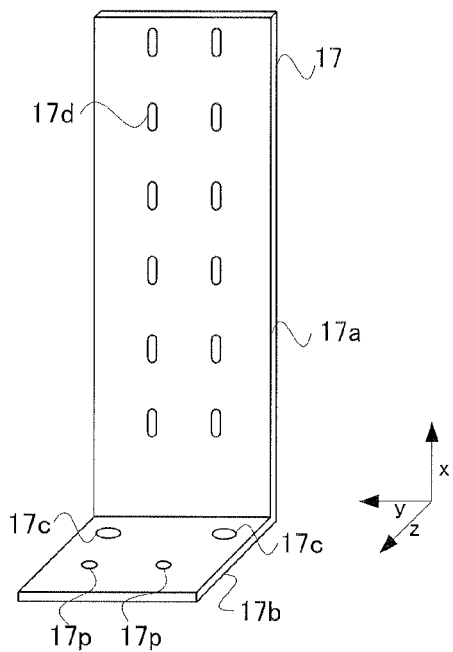
Fig.17
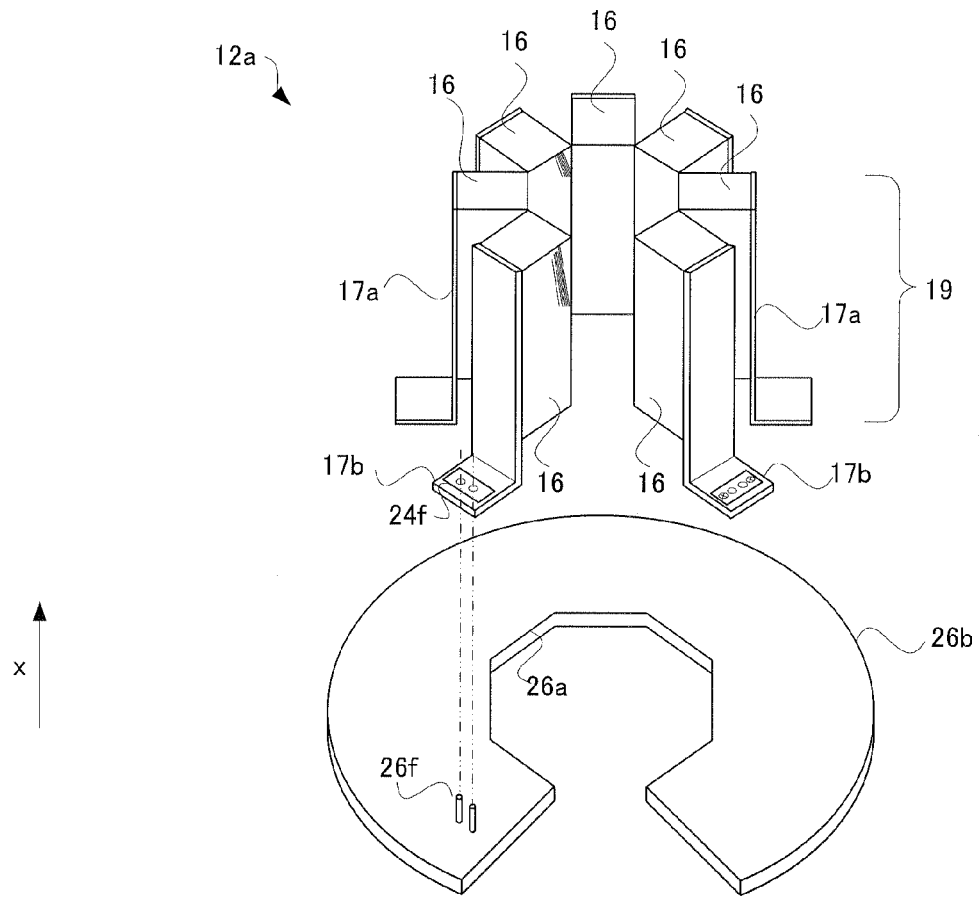

Fig.18
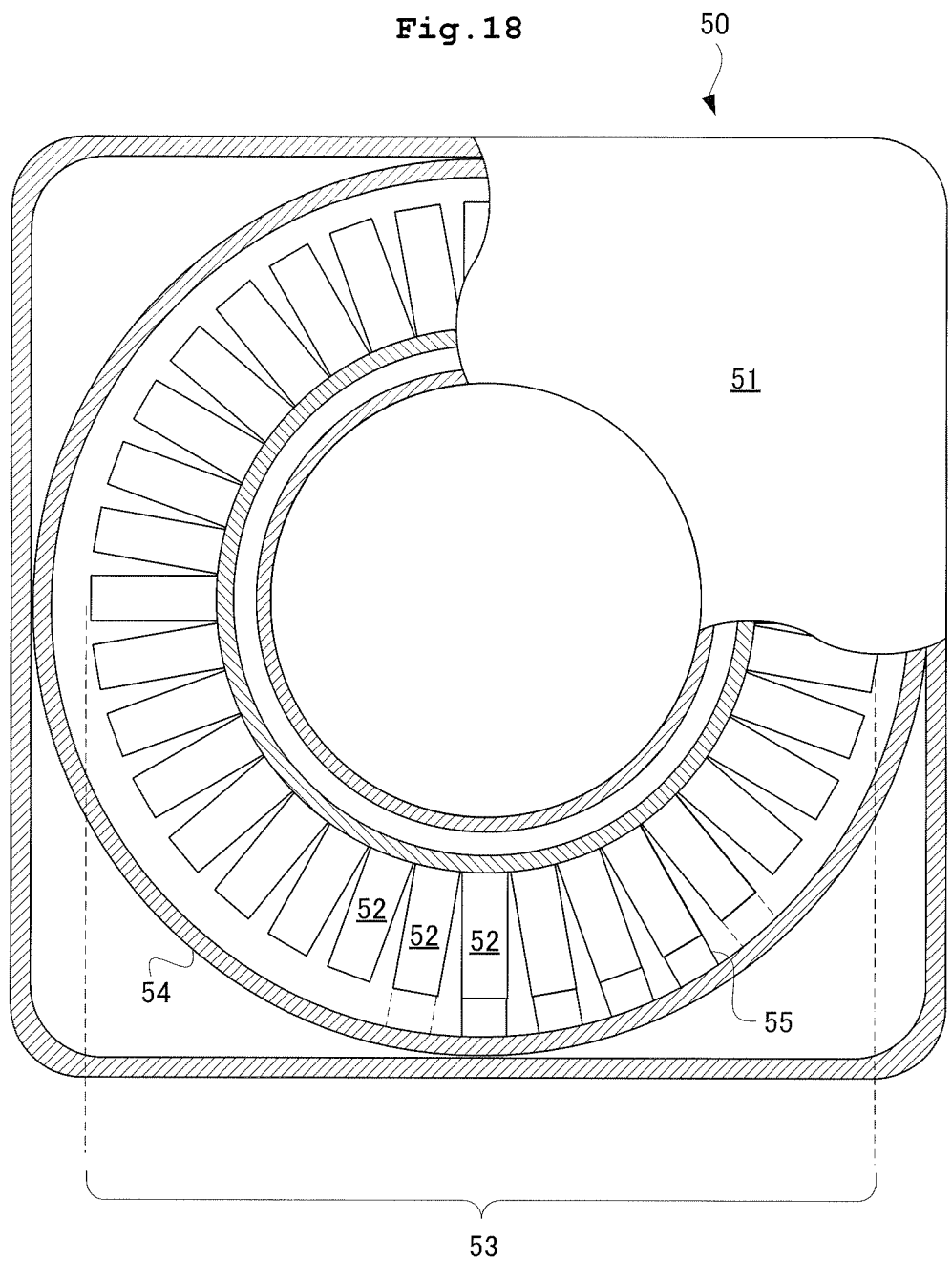
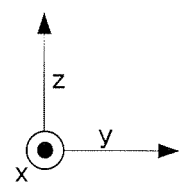

METHOD OF MANUFACTURING RADIATION TOMOGRAPHY APPARATUS

TECHNICAL FIELD

This invention relates to radiation tomography apparatus that images radiation. Particularly, this invention relates to radiation tomography apparatus having block, radiation detectors arranged in a ring shape.

BACKGROUND ART

In medical fields, radiation emission computed tomography (ECT: Emission Computed Tomography) apparatus is used that detects an annihilation radiation pair (for example, gamma rays) emitted from radiopharmaceutical that is administered to a subject and is localized to a site of interest for obtaining sectional images of the site of interest in the subject showing radiopharmaceutical distributions. Typical ECT apparatus includes, for example, a PET (Positron Emission Tomography) device and an SPECT (Single Photon Emission Computed Tomography) device.

A PET device will be described by way of example. The PET device has a group of detectors having block radiation detectors arranged in a ring shape. The group of detectors is provided, for surrounding a subject, and allows detection of an annihilation radiation pair that is transmitted through the subject.

First, description will be given of a configuration of a conventional PET device. As shown in FIG. 18, a conventional PET device 50 includes a gantry 51 with an introducing hole that introduces a subject, a group of detectors 53 having block radiation detectors 52 for detecting radiation being arranged inside the gantry 51 so as to surround the introducing hole, and a holding member 54 provided so as to surround the group of detectors 53. Each of the radiation detectors 52 has a bleeder unit 55 with a bleeder circuit in a position between the holding member 54 and thereof for connecting the holding member 54 and the radiation detector 52. The bleeder unit 55 is coupled to a light detector 62, mentioned later, in the radiation detector 52.

Such radiation detector arranged in the group of detectors of the PET device is often equipped that allows position discrimination in a depth direction of a scintillator provided in the radiation detector for improved resolution. Next, description will be given of a construction of the radiation detector 52. As shown in FIG. 19, the conventional radiation detector 52 includes a scintillator 61 that converts radiation into fluorescence, and a photomultiplier tube (hereinafter referred to as a light detector) 62 that detects fluorescence. The scintillator 61 has scintillation counter crystals 63 of rectangular solid that are arranged in a two-dimensional array. The light detector 62 allows discrimination about which scintillation counter crystal 63 emits fluorescence. That is, the radiation detector 52 may discriminate an incidence position of radiation in the scintillator 61. A light guide 64 is provided between the scintillator 61 and the light detector 62 for receiving fluorescence.

Here in the PET device 50, the radiation detectors 52 in the group of detectors 53 have to be arranged precisely. The PET device 50 acquires a sectional image based on an incidence direction of radiation. Accordingly, when a deviation occurs in arrangement of the radiation detectors 52 in the group of detectors 53, the deviation also influences the sectional image acquired with the PET device 50. Specifically, where the radiation detectors 52 in the group of detectors 53 are not positioned as they are by an original setting, the incidence position of radiation determined with the group of detectors 53 deviates from an actual incidence position thereof even when localization of radiopharmaceutical in the subject is identified from data that is outputted from the group of detectors 53. Thus, the conventional PET device 50 has a configuration in which the holding member 54 is divided into split sections, and the radiation detectors are loaded therein in order that the radiation detectors 52 are regularly arranged to the extent possible (see, for example, Patent Literature 1.)

PATENT LITERATURE 1

Japanese Patent Publication No. 2004-279057

DISCLOSURE OF THE INVENTION

Problem to be Solved by the Invention

However, the conventional radiation tomography apparatus has the following drawbacks. That is, according to the conventional configuration, when the radiation detectors 52 are arranged, positioning thereof is performed with reference to the bleeder unit 55. Taking into consideration that, in the radiation detector 52, the incidence position of radiation is identified by discrimination about which scintillation counter crystal 63 emits fluorescence, not the bleeder unit 55 but the scintillator 61 of the elements in the group of detectors 53 needs to be arranged regularly. The light detector 62 having the radiation detectors 52 is coupled to the holding member 54 via the bleeder unit 55. Consequently, the light detector 62 and the bleeder unit 55 must not deviate in its coupling position for regular arrangement of the radiation detectors 52.

In addition, according to the conventional radiation tomography apparatus, the scintillator 61 constituting the radiation detector 52 and the light detector 62 must not deviate in its coupling position. Although the light detectors 62 are regularly arranged in the group of detectors 53, where the light detector 62 and the scintillator 61 deviate in its coupling position in each of the radiation detectors 52, arrangement of the scintillators 61 will deviate accordingly. According to the foregoing configuration as noted above, upon arrangement of the radiation detectors 52 in the group of detectors 53, each of the adjacent scintillators 61 is not ensured to be arranged regularly in the radiation detector 52 since the radiation detector 52 is not positioned with reference to the scintillator 61.

On the other hand, however, when the scintillator 61 is accurately coupled to the light detector 62, the scintillator 61 and the holding member 54 are supported on the light detector 62 and the bleeder unit 55, which leads to further deviation in the coupling position of each member. That is, it is not easy to form the group of detectors 53 of the conventional, configuration with the scintillators 62 being arranged regularly.

In other words, according to the conventional configuration, even when the scintillation counter crystals 63 are arranged with high accuracy to form the scintillators 61, the arrangement of the scintillators 61 deviate when seen the group of detectors 53 in its entirety. As a result, high position discrimination function of radiation in the single radiation detector 52 is useless without being efficiently employed in the PET device.

This invention has been made regarding the state of the art noted above, and its object is to provide radiation tomography apparatus having higher spatial resolution by suppressing deviation in arrangement of scintillators and manufacturing a group of detectors with the scintillators being arranged regularly upon arranging radiation detectors for forming the group of detectors.

Means for Solving the Problem

This invention is constituted as stated below to achieve the above object. A method of manufacturing radiation tomography apparatus according to this invention includes a group of detectors in an annular shape, the group of detectors having detector arrays in a ring shape with each of radiation detectors arranged in series in which a scintillator that converts radiation into fluorescence, a light guide that receives fluorescence, and a light detector that detects fluorescence are laminated in a height direction. The method includes a detector array formation step of forming a detector array having two or more radiation detectors integrated with one another; a first holding member fixation step of fixing a sub member of a holding member having a main member and the sub member that extends from the main member to a base of a first jig having the base, a branch portion that extends from the base, and a supporting device; a detector array placement step of inserting the detecting array into a position between the branch portion and the main member for placing the detector array on the first jig; a second holding member fixation step of fixing the detector array to the holding member by adjusting a relative position of the detector array and the holding member in a direction where the scintillator and the base are spaced through contact of the scintillator of the detector array to the supporting device; and a group of detectors formation step of forming the group of detectors by fixing the sub member to a base member plate to arrange the detector arrays at least in a circular shape.

Operation and Effect

According to this invention, the first jig positions a relative position of the detector array and the holding member. The first jig has the support device provided thereon for supporting the scintillator and determining a clearance between the scintillator and the base. Taking into consideration that the sub member is placed on the base, one clearance is certainly determined between the sub member and the scintillator. Consequently, the detector arrays are also to be arranged accurately merely by arranging the sub members annularly to fix them to the base member, thereby fanning the group of detectors. According to the radiation tomography apparatus manufactured with the configuration of this invention, the radiation detectors in the group of detectors may be arranged more regularly. Therefore, decrease in spatial resolution may be suppressed as much as possible that occurs from arrangement deviation of the radiation detectors in the group of detectors upon counting the number of annihilation radiation pairs for determination of the radiation intensity distribution.

Moreover, the following is more desirable. That is, the above base of the first jig and the sub member have a first positioning device provided therein. A relative position is determined of the holding member with respect to the first jig in a given direction via the first positioning device in the first holding member fixation step. The branch portion of the first jig and the scintillator have a second positioning device. A relative position is determined of the detector array with respect to the first jig in a given direction via the second positioning device in the second holding member fixation step. A relative positional relationship between the holding member and the detector array in a given direction is determined via the first

Operation and Effect

The foregoing configuration may realize not only adjustment in position of the sub member and the scintillator in a spacing direction but also determination, for example, of the relative position in a given direction perpendicular thereto. Upon placement of the holding member on the first jig, the first jig and the holding member are positioned based on the first positioning device provided in the base of the first jig and the sub member. Accordingly, a positional relationship may reliably be established between the holding member and the branch portion of the first jig in a given direction. Moreover, in the second holding member fixation step, a relative position is determined, of the detector array with respect to the first jig in a given direction via the second positioning device. At this time, a positional relationship is determined between the detector array and the first jig in a given direction. Accordingly, a positional relationship is determined between the detector array and the holding member in a given direction via the first jig. The radiation tomography apparatus manufactured with the foregoing configuration may realize more regular arrangement of the radiation detectors in the group of detectors.

Moreover, it is more preferable that the foregoing configuration includes a second jig placement step of placing the holding member on a bottom by contacting the scintillator of the detector array to a stem of a second jig having the bottom and the stem extending therefrom, thereby adjusting, a relative position of the second jig and the detector array in a direction where the scintillator and the stem contact to each other; and a plate fixation step of fixing a plate to the sub member while adjusting the relative position in a given direction of the detector array with respect to the stem with a third positioning device provided in the stem of the second jig and the scintillator. It is more preferable that, in the group of detectors formation step, the detector arrays with respect to the base member are adjusted in position based on a position of the plate, and are arranged at least circularly.

Operation and Effect

The foregoing configuration may ensure a given relative position of the detector array and the holding member. According to the foregoing configuration, even when the relative position of the detector array and the holding member deviates not only in (A) a direction where the sub member and the scintillator are spaced and (B) a given direction but also (C) a direction where the scintillator contacts the stem, the deviation may be corrected with the plate. According to the foregoing configuration, the scintillator of the detector array contacts the stem of the second jig, which results in adjustment in position of the second jig and the detector array. Thereafter, the plate is adjusted in position based on the position of the stein of the second jig for fixation to the sub member. Consequently, the position of the detector array and the plate may reliably be ensured with no influence on deviation in relative position of the detector array and the holding member. Thus, annular arrangement of the detector arrays based on the position of the plate may realize more regular arrangement of the radiation detectors in the group of detectors.

Moreover, it is more desirable that a fourth positioning device is provided in the bottom of the second jig and the plate, and a relative position of the plate with respect to the sub member in the plate fixation step is determined via the fourth positioning device.

Operation and Effect

According to the foregoing configuration, the relative position of the plate with respect to the sub member may reliably be determined based on the position of the stem of the second jig. The relative position is determined of the plate with respect to the sub member via the fourth positioning device provided in the plate and the bottom of the second jig. That is, the position of the plate with respect to the holding member is determined via the fourth positioning device with no influence on positional relationship between the second jig and the sub member. In other words, with the foregoing configuration, the relative position of the plate with respect to the sub member may reliably be determined based on the detector array.

Moreover, the following is desirable. That is, a fifth positioning device is provided in the base member and the plate, and a relative position of the detector array with respect to the base member in the group of detectors formation step is determined via the fifth positioning device.

Operation and Effect

According to the foregoing configuration, the detector arrays are annularly arranged based on the position of the plate. That is because the relative position of the detector array with respect to the bottom member is determined via the fifth positioning device. The relative position of the plate with respect to the holding member is determined based on the detector array. As a result, when the plate is merely arranged accurately on the bottom member, the detector arrays may be arranged accurately in an annular shape. There is no particular difficulty in arranging the plate on the base member. It is just need to determine the relative position of the plate on the base member via the fifth positioning device.

This invention may also adopt a configuration where the second jig is omitted. That is, a sixth positioning device may be provided in the base of the first jig and the sub member, and a seventh positioning device may be provided in the base member and the sub member. The relative position of the detector array with respect to the holding member in the second holding member fixation step may be determined through contact of the scintillator of the detector array to the branch portion and the supporting device and via the sixth positioning device. The relative position of the detector array with respect to the base member in the group of detectors formation step may be determined via the seventh positioning device.

Operation and Effect

According to the foregoing configuration, a configuration may be provided without the foregoing second jig being always required. That is, the first jig and the sub member have the sixth positioning device provided therein. The relative position of the holding member and the first jig is determined via the sixth positioning device. Consequently, the relative position of a detector array and a holding member may reliably be determined. Moreover, the base member and the sub member have the seventh positioning device provided therein. The relative position of the detector array with respect to the base member in the group of detectors formation step is determined via the seventh positioning device. Such configuration may ensure annular arrangement of the holding members via the seventh positioning device. Taking into consideration that the relative position of the detector array and the holding member is reliably determined, accurate arrangement of the holding members may ensure secure arrangement of the detector arrays in an annular shape. As noted above, the radiation tomography apparatus may be provided having minimized deviation in position of the radiation detectors.

Effect of the Invention

According to this invention, the first jig determines the relative position of the detector array and the holding member. That is because the first jig has the supporting device provided therein for supporting the scintillator so as to ensure a given clearance between the sub member and the scintillator. Moreover, a given positional relationship may be achieved not only in a direction where the sub member and the scintillator are spaced but also in a given direction perpendicular thereto. That is because the first positioning device determines the positional relationship between the first jig and the holding member in a given direction.

The detector array and the holding member in this invention are adjusted in relative positional relationship with three positioning methods that are independent to one another. Specifically, the positioning methods are those using the supporting device, the first and second positioning devices, and the plate. Such configuration may realize assignment of these positioning methods to three directions, respectively, that are perpendicular to one another. In other words, the relative positional relationship between the detector array and the holding member in this invention may be adjusted in three directions that are perpendicularly to one another. Consequently, no direction exists where the detector array and the holding member may deviate upon arranging of the holding members annularly to form the group of detectors.

BRIEF DESCRIPTION OF THE DRAWINGS

FIGS. 16 and 17 are perspective views each showing a configuration of one modification according to this invention.

FIG. 18 is a sectional cut-away view showing a configuration of conventional radiation tomography apparatus.

DESCRIPTION OF REFERENCES

Figure 1:
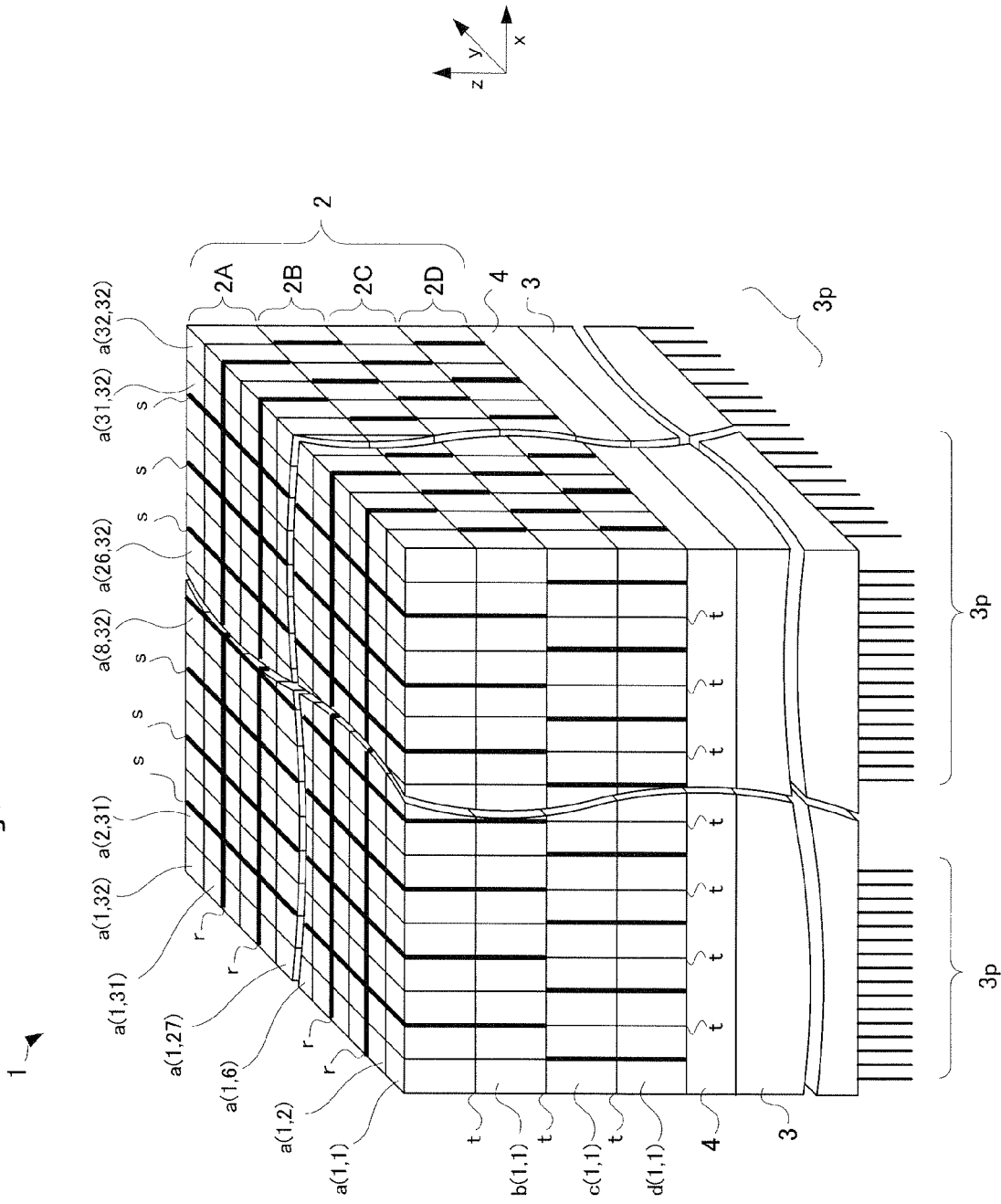
FIG. 1 is a perspective view of a radiation detector according to Embodiment 1.

S1 . . . detector array formation step
S2 . . . first holding member fixation step
S3 . . . detector array placement step
S4 . . . second holding member fixation step
S5 . . . second jig placement step
S6 . . . plate fixation step
S8 . . . group of detectors formation step
1 . . . radiation detector
2 . . . scintillator
3 . . . light detector
16 . . . detector array
17 . . . holding member
17a . . . main member (main member
17b . . . sub member (sub member)
21 . . . first jig
21a . . . branch portion
21b . . . base
22 . . . second jig
22a . . . stem
22b . . . bottom
24 . . . plate
26 . . . circular plate base member)

BEST MODE FOR CARRYING OUT THE INVENTION

Embodiments of radiation tomography apparatus according to this invention will be described hereinafter with reference to the drawings, Embodiment 1

Firstly, prior to explanation of a method of manufacturing radiation tomography apparatus according to Embodiment 1, description will be given of a configuration of a radiation detector 1 according to Embodiment 1. FIG. 1 is a perspective view of the radiation detector according to Embodiment 1. As shown in FIG. 1, the radiation detector according to Embodiment 1 includes a scintillator 2 that is formed of scintillation counter crystal layers each laminated in order of a scintillation counter crystal layer 2D, a scintillation counter crystal layer 2C, a scintillation counter crystal layer 2B, and a scintillation counter crystal layer 2A, in turn, in a z-direction, a photomultiplier tube (hereinafter referred to as a light detector) 3 having a function of position discrimination that is provided on an undersurface of the scintillator 2 for detecting fluorescence emitted from the scintillator 1r, and a light guide 4 interposed between the scintillator 2 and the light detector 3. Consequently, each of the scintillation counter crystal layers is laminated in a direction toward the light detector 3. In other words, the scintillator 2 has scintillation counter crystals arranged in a three-dimensional array. Here, the z-direction corresponds to a height direction in this invention.

Here, the scintillation counter crystal layer 2A corresponds to an incident surface of radiation in the scintillator 2. Each of the scintillation counter crystal layers 2A, 2B, 2C, and 2D is optically coupled, and includes a transparent material t of cured thermosetting resin between each of the layers. A thermosetting resin composed of a silicone resin may be used for the transparent material t. The scintillation counter crystal layer 2A corresponds to a receiver of the gamma rays emitted from a radioactive source. The scintillation counter crystals in a block shape are arranged in a two-dimensional array with thirty-two numbers of the scintillation counter crystals in an x-direction and thirty-two numbers of the scintillation counter crystals in a y-direction relative to a scintillation counter crystal a (1, 1). That is, the scintillation counter crystals from a (1, 1) to (1, 32) are arranged in the y-direction to form a scintillator crystal array. Thirty-two numbers of the scintillator crystal arrays are arranged in the x-direction to form a scintillation counter crystal layer 2A. Here, as for the scintillation counter crystal layers 2B, 2C, and 2D, thirty-two numbers of the scintillator counter crystals are also arranged in the x-direction and the y-direction in a matrix in a two-dimensional array relative to a scintillation counter crystal b (1, 1), c (1, 1), and d (1, 1), respectively. In each of the scintillation counter crystal layers 2A, 2B, 2C, and 2D, the transparent material t is also provided between the scintillation counter crystals adjacent to each other. Consequently, each of the scintillation counter crystals is to be enclosed with the transparent material t. The transparent material t has a thickness around 25 μm. A gamma ray corresponds to radiation in this invention.

First reflectors r that extend in the x-direction and second reflectors s that extend in the y-direction are provided in the scintillation counter crystal layers 2A, 2B, 2C, and 2D provided in the scintillator 2. Both reflectors r and s are inserted in a gap between the arranged scintillation counter crystals.

The scintillator 2 has scintillation counter crystals suitable for detection of gamma rays in a three-dimensional array. That is, the scintillation counter crystal is composed of Ce-doped $Lu_{2(i-x)}Y_{2x}SiO_5$ (hereinafter referred to as LYSO.) Each of the scintillation counter crystals is, for example, a rectangular solid having a length of 1.45 mm in the x-direction, a width of 1.45 mm in the y-direction, and a height of 4.5 mm regardless of the scintillation counter crystal layer. The scintillator 2 has four side end faces that are covered with a reflective film not shown. The light detector 3 is multi-anode type, and allows position discrimination of incident fluorescence in the x and y-directions.

The light guide 4 is provided for guiding fluorescence emitted in the scintillation 2 into the light detector 3. Consequently, the light guide 4 is optically coupled to the scintillator 2 and the light detector 3. The light detector has two or more connection terminals $3p$ provided on a bottom face opposed to the scintillator 2. These connection terminals $3p$ are connected to a bleeder unit 18, mentioned later.

Figure 2:
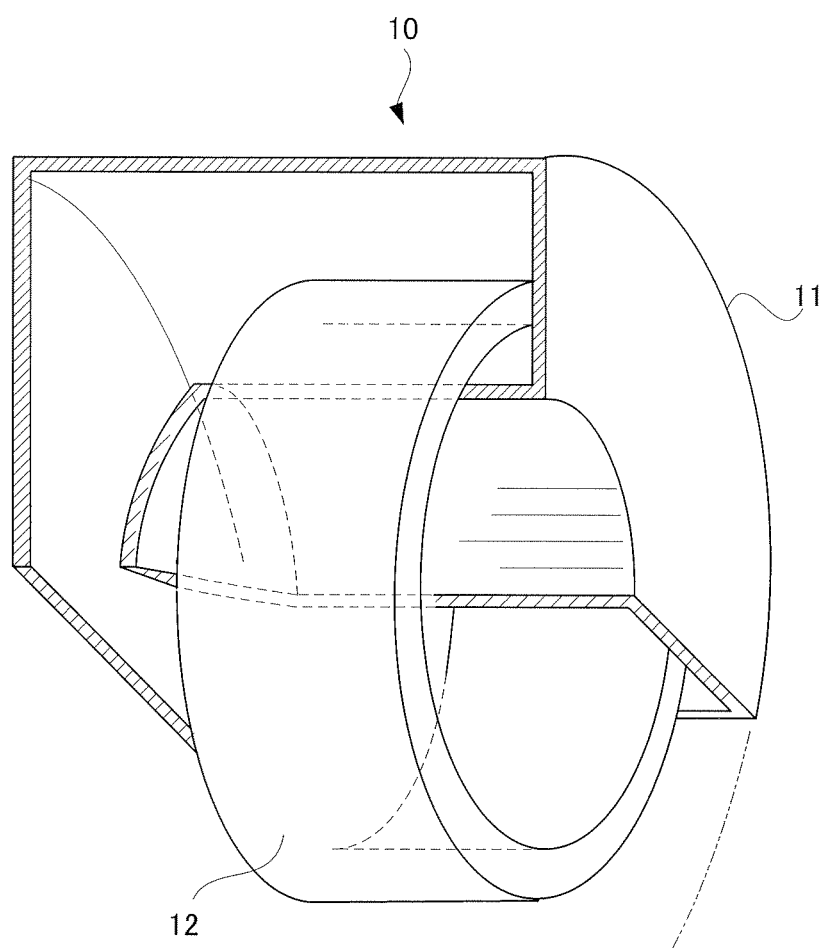
FIG. 2 is a sectional cut-away view showing a configuration of radiation tomography apparatus according to Embodiment 1.

Next, description will be given of a configuration of radiation tomography apparatus 10 according to Embodiment 1. FIG. 2 is a sectional cut-away view showing a configuration of the radiation tomography apparatus according to Embodiment 1. As shown in FIG. 2, the radiation tomography apparatus 10 according to Embodiment 1 has a gantry 11 having an opening for introducing a subject, and a group of detectors (detector ring) 12 in a circular ring shape that is provided inside the gantry 11 so as to contain the opening of the gantry 11. Gamma rays emitted from the subject enter into the group of detectors 12. The group of detectors 12 in the radiation tomography apparatus 10 determines intensity, an incident period of time, and an incident position of incident gamma rays. Description will be give hereinafter of a method of manufacturing such radiation tomography apparatus.

Figure 3:
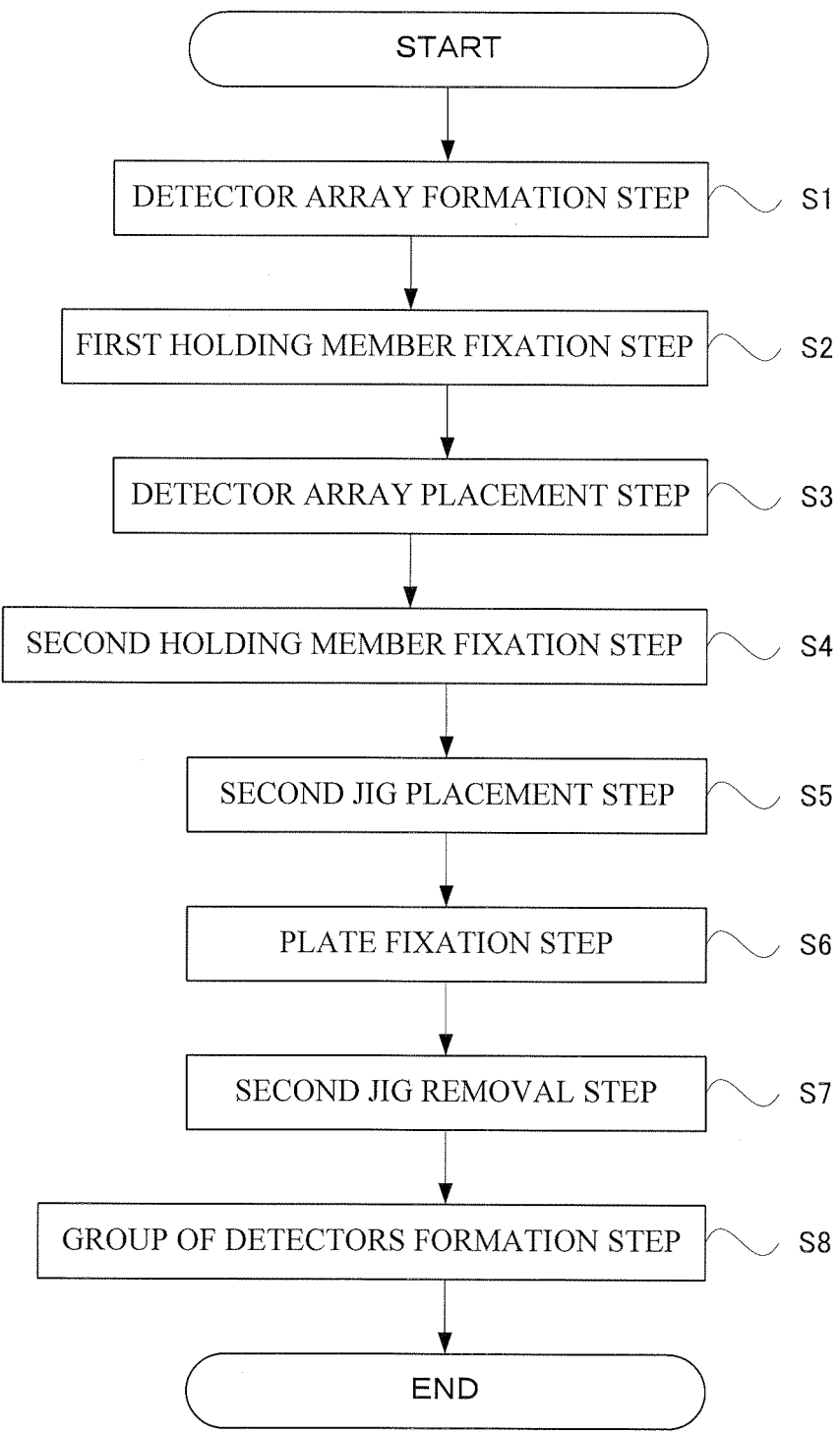
FIG. 3 is a flow chart showing a method of manufacturing the radiation tomography apparatus according to Embodiment 1.

FIG. 3 is a flow chart showing a method of manufacturing the radiation tomography apparatus according to Embodiment 1. As shown in FIG. 3, a method of manufacturing the radiation tomography apparatus 10 according to Embodiment 1 includes a detector array formation step S1 for forming a detector array 16 having three radiation detectors 1 coupled in series for integration; a holding member fixation step S2 for placing a holding member 17 on a first jig 21; a detector array placement step S3 for placing the detector array 16 on the first jig 21; a second holding member fixation step S4 for fixing both members 16, 17 through determination of a relative position of the detector array 16 and the holding member 17 by use of the first jig 21; a second jig placement step S5 for removing a detector unit 19 manufactured in previous steps from the first jig 21, and then fixing it to a second jig 22; a plate fixation step S6 for fixing a plate 24 to a sub member 17b of the holding member 17; a second jig removal step S7 for removing the holding member 17 from the second jig 22; and a group of detectors formation step S8 for contacting the sub member 17b of the holding member 17 to a circular plate 26, thereby arranging the detector arrays 16 in an annular shape. These manufacturing steps will be described hereinafter in order.

<Detector Array Formation Step S1>

Figure 4:
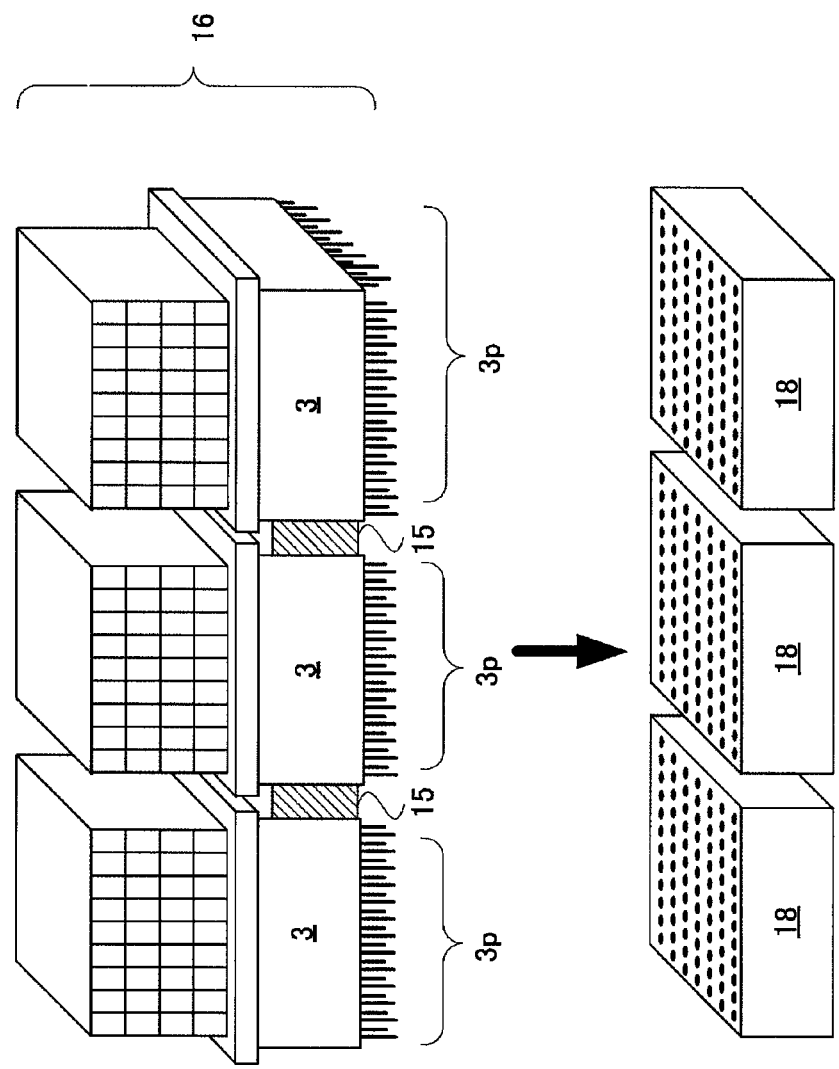
FIG. 4 is a perspective view showing a detector array formation step according to Embodiment 1.

In the detector array formation step S1, three radiation detectors 1 are bonded to one another with an adhesive via a spacer 15 for integration, whereby the detector array 16 (see FIG. 4) is formed. Specifically, the spacer 15 is arranged between two lights detectors 3 and contacts one side end of the light detectors 3 of the radiation detector 1. Moreover, a clearance between each radiation detector 1 is determined based on the scintillator 2 of the radiation detector 1. Specifically, adjacent scintillators 2 are set to have a clearance therebetween having integer multiples of a width in an x-direction of the scintillation counter crystal (arrangement direction of the radiation detector 1) that forms the scintillator 2. According to the configuration of Embodiment 1, the clearance between each scintillator 2 is set to be twice the width of the scintillation counter crystal in the x-direction. Moreover, the scintillators 2 are equal to one another in position of each radiation detector 1 in a y-direction a short side direction of the detector array 16.) Such configuration may realize positioning of the scintillation counter crystals under consideration of the entire detector array 16, which results in provision of the radiation tomography apparatus 10 that allows mapping of incident positions of gamma rays with more accuracy. Thereafter, as shown in FIG. 4, the connection terminals 3p provided on an under surface of the detector array 16 are inserted into sockets provided in the bleeder unit 18. Accordingly, the detector array 16 is to be integrated with three bleeder units 18. Here, the bleeder unit 18 has screw holes 18d on a bottom face thereof that is opposed to the scintillator 2, which is to be described later.

<First Holding Member Fixation Step S2>

Figure 5:
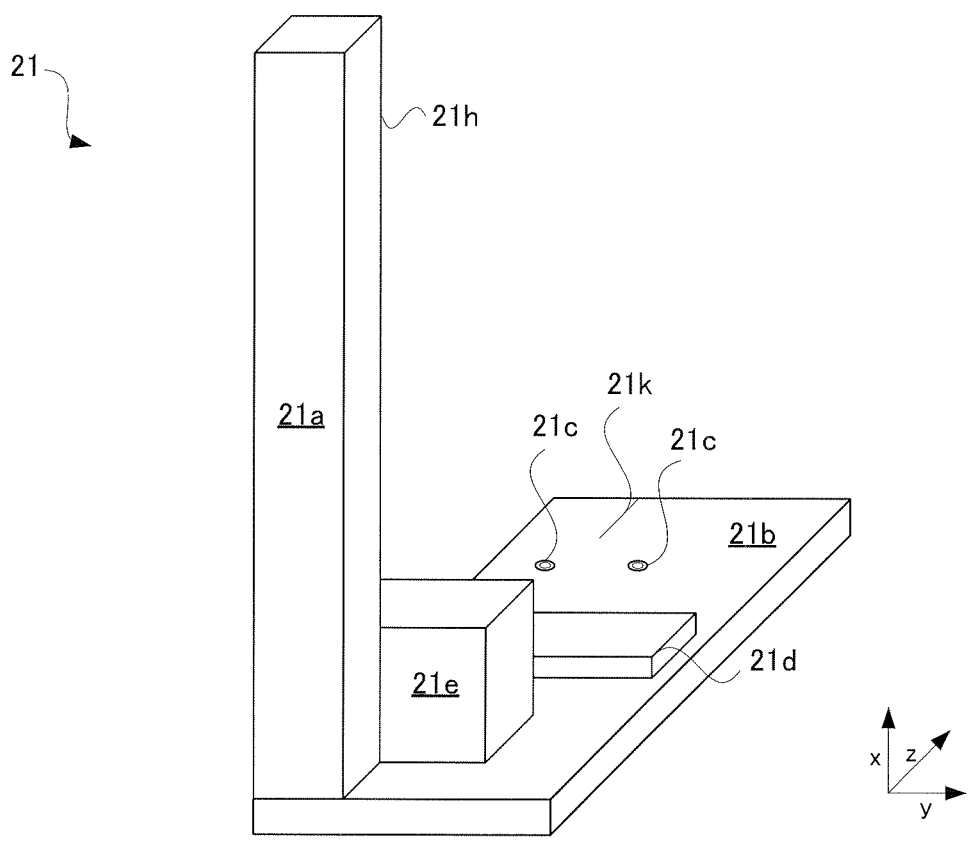
FIG. 5 is a perspective view showing a configuration of a first jig according to Embodiment 1.

Here, the holding member 17 is fixed to the first jig 21 independently of forming the detector array. Description will be given of a configuration of the first jig 21 used in this step. FIG. 5 is a perspective view showing a configuration of the first jig, according to Embodiment 1. As shown in FIG. 5, the first jig 21 according to Embodiment 1 has a planar base 21b directed to a yz-plane and a prismatic branch portion 21a perpendicular to the base 21b that extends in the x-direction. The base 21b has two screw holes 21c for fixing the holding member 17, a prismatic contact portion 21d for contacting a main member 17a of the holding member 17 that extends in the x-direction, and a prismatic support board 21e for supporting the scintillator 2 of the detector array 16 that extends in the x-direction. In addition, the base 21b has a marking 21k provided therein that extends in the z-direction. Seen the first jig 21 in the x-direction, the base 21b has the branch portion 21a, the support board 21e, the contact portion 21d, the screw holes 21c, and the marking 21k arranged, in turn, in the z-direction. Here, a position in the y-direction of the marking 21k is equal to a position in the y-direction of one side 21h of the branch portion 21a that extends in the x-direction. The support board 21e corresponds to the support device in this invention.

Figure 6:
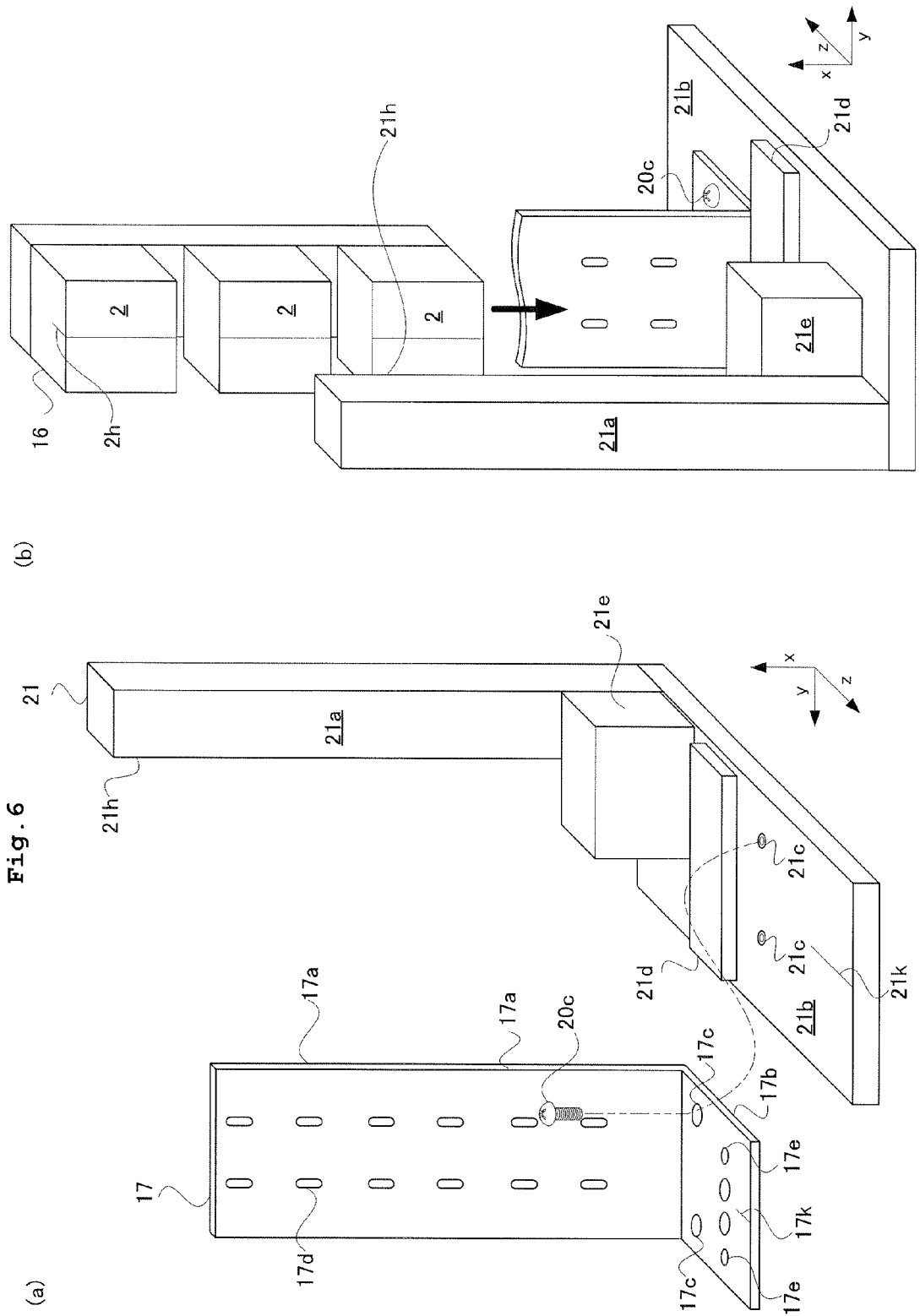
FIG. 6 shows each step according, to Embodiment 1.

As shown in FIG. 6(a), in operation during the first holding member fixation step S2, the L-shaped holding member 17 having the plate main member 17a and the sub member 17b is placed on the base 21b of the first jig 21. At this time, the sub member 17b is directed. Opposite to the foregoing branch portion 21a. On the other hand, the main member 17a is directed toward the branch portion 21a. As shown in FIG. 6(a), the sub member 17b has two drilled holes 17c through which screws 20c are inserted. Then, the screw 20c is screwed into the screw hole 21c provided in the base 21b. As noted above, the holding member 17 is fixed to the first jig 21.

Description will be given in detail of a positional relationship between the holding member 17 and the first jig 21. First, the main member 17a is brought into contact with the contact portion 21d provided on the base 21b. Accordingly, the relative position of the main member 17a with respect to the first jig 21 is to be determined in the z-direction where the holding member 17 and the branch portion 21a are opposed to each other. Simultaneously, the position of the holding member 17 with respect to the first jig 21 is adjusted such that the marking 17k provided, in the sub member 17b is equal in position to the marking 21k provided in the base 21b in the y-direction. Consequently, the relative position is determined of the holding member 17 and the branch portion 21a in the y-direction. Moreover, the sub member 17b has two through holes 17f and two screw holes 17e, which is to be mentioned later. Here, the marking 17k and 21k correspond to the first positioning device in this invention. In addition, the y-direction corresponds to a given direction in this invention.

<Detector Array Placement Step S3>

As shown in FIG. 6(b), the detector array 16 is inserted between the branch portion 21a and the main member 17a. A direction is selected as an insertion direction of the detector array 16 where a long side direction of the detector array 16 conforms to an extending direction of the branch portion 21, and the scintillator 2 of the detector array 16 is directed toward the branch portion 21a. Consequently, the main member 17a is adjacent to the bottom face of the bleeder unit 18 of the detector array 16. Clearance is also provided between the main member 17a and the branch portion 21a into which the detector array 16 may be inserted.

Upon insertion of the detector array 16, the scintillator 2 that constitutes the detector array 16 is supported by the support board 21e. Accordingly, the relative position is determined of the detector array 16 and the base 21b. In other words, the relative position may be determined of the sub member 17b and the detector array 16 in the x-direction. Here, the x-direction corresponds to the direction in this invention where the scintillator and the base are spaced from to each other.

<Second Holding Member Fixation Step S4>

Next, the second holding member fixation step S4 is performed for fixing the holding member 17 and the detector array 16. First, the detector array 16 is positioned and the screw 20d is inserted through a long hole 17d provided in the main member 17a. Specifically, the detector array 16 is positioned based on the branch portion 21a. That is, the detector array 16 is positioned such that a center line 2h of the detector array 16 in the y-direction is equal in position to one side 21h of the branch portion 21a extending in the x-direction. The center line 2h in the detector array 16 actually correspond to a first reflector r. The scintillator according to Embodiment 1 has thirty-two scintillation counter crystals arranged in the y-direction. Accordingly, the center line 2h is a first reflector r between the sixteenth and seventeenth scintillators in the y-direction. The first reflector r is referred to as a center reflector for convenience. The center reflector is of a ribbon shape that extends in the x-direction. Taking into consideration that the detector array 16 has three scintillators 2, the center reflector exits in each of the three scintillators 2. In the second holding member fixation step S4, three center reflectors that extend in the x-direction conform to one side 21h that extends in the x-direction. Consequently, the detector array 16 is set to have a longitudinal direction parallel to the x-direction. Here, the center line 2h corresponds to the first reflector r in Embodiment 1. The center line 2h, however, may be a transparent material t through variation in setting of the scintillator 2, in addition, the center line 2h and one side 21h correspond to the second positioning device of this invention.

Figure 7:
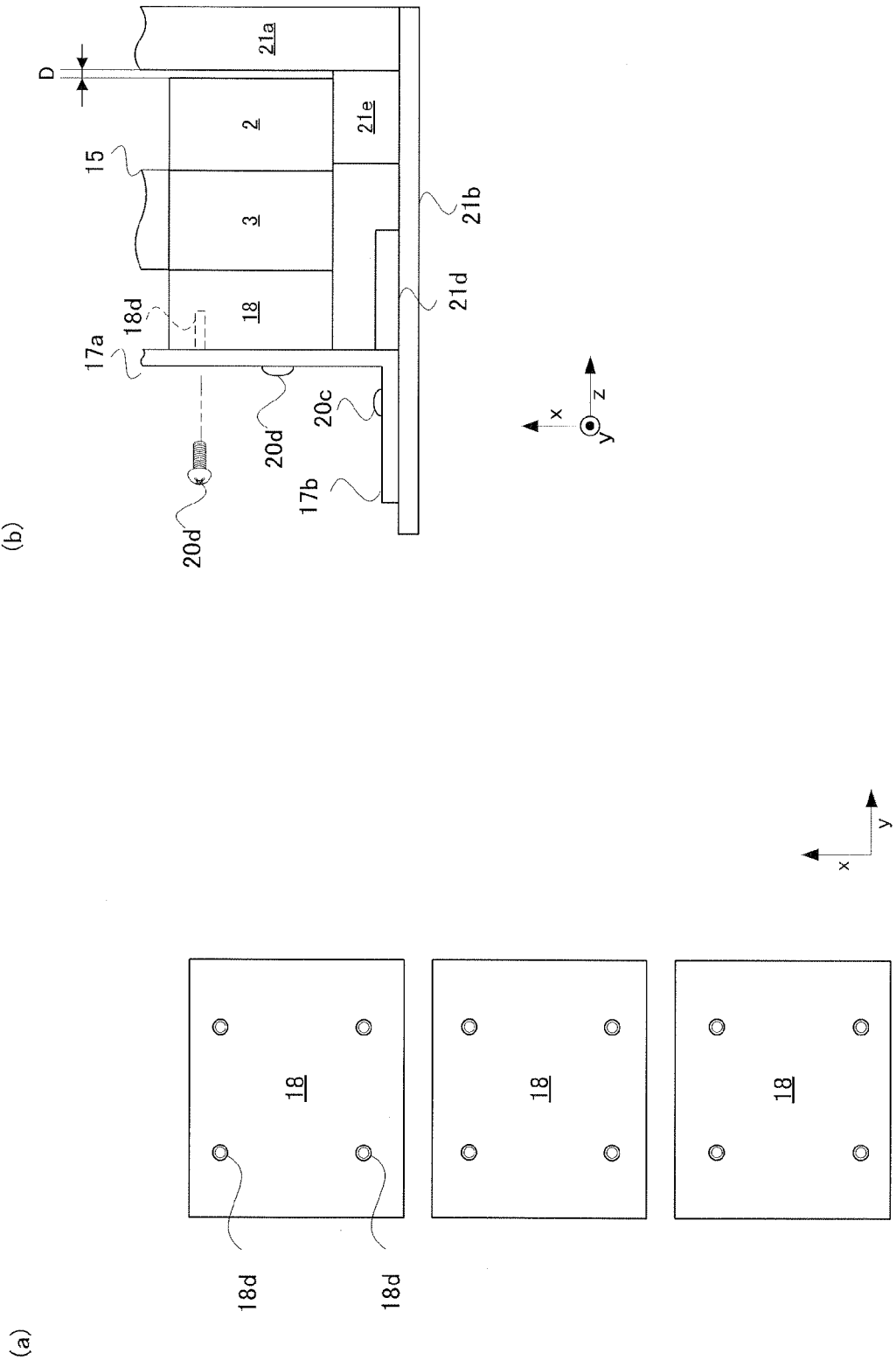
FIG. 7 a plan view showing each step according to Embodiment 1.

The holding member 17 and the detector array 16 are fixed by use of the screw holes 18 provided in the bleeder unit 18. First, description will be given of a bottom face of the bleeder unit 18. As shown in FIG. 7(a), the bleeder unit 18 has screw holes 18d on the bottom face thereof. The bottom face of the bleeder unit 18 attached on the detector array 16 and the holding member are adjacent to each other. That is, as shown in FIG. 7(b), the screw 20d is screwed into the screw hole 18d provided in the bleeder unit 18 for fixation, thereby integrating the detector array 16 and the holding member 17. FIG. 7(b) illustrates a condition where the screw 20d is fixed. As shown in FIG. 7(b), the main member 17a contacts the bleeder unit 18, whereas a gap D is provided between the scintillator 2 and the branch portion 21a. This is a clearance necessary for placement of the detector array 16 on the first jig 21 in the detector array placement step S3. Specifically, the gap D has a distance of around 1 mm.

Figure 8:
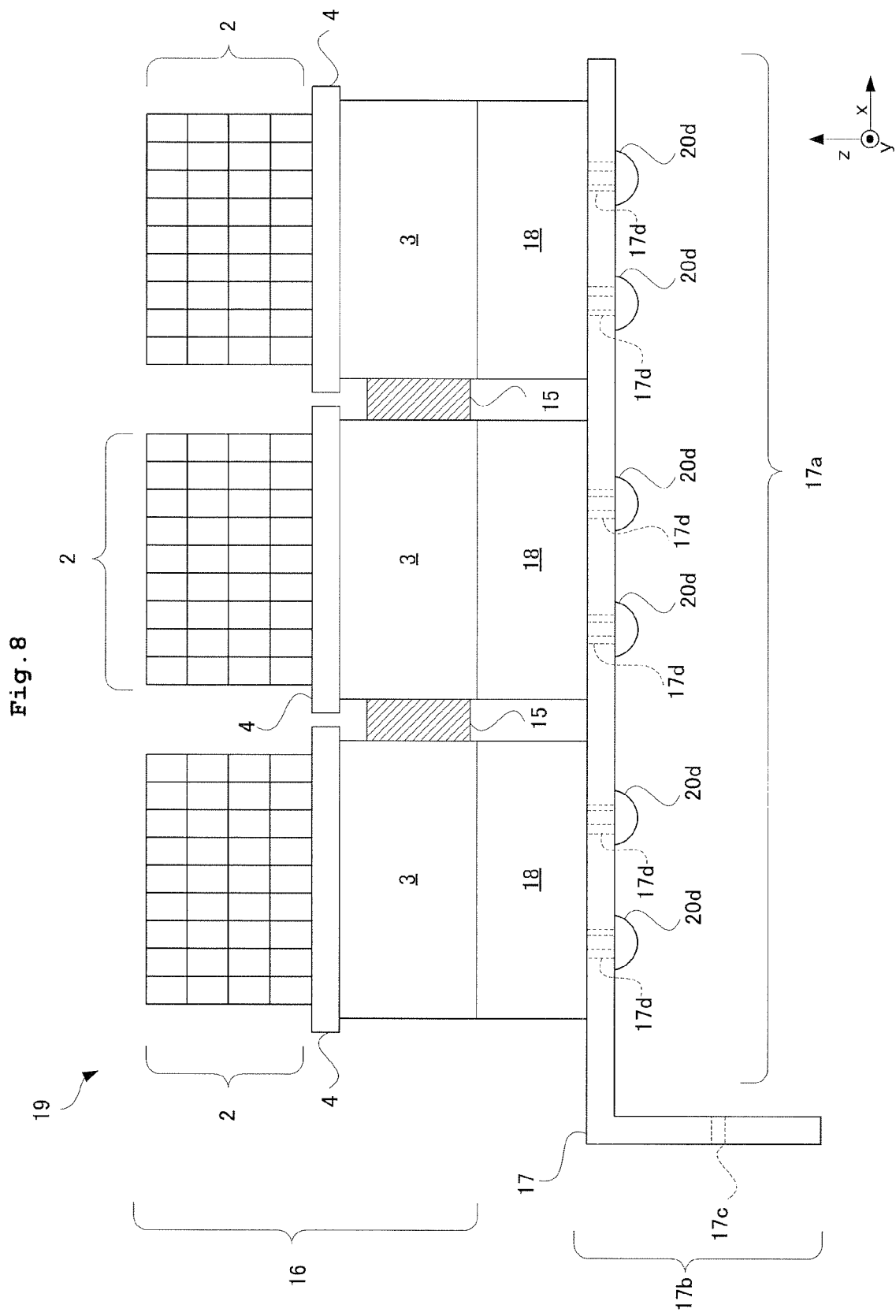
FIG. 8 is a plan view showing a configuration of a detector unit according to Embodiment 1.

Accordingly, the detector unit 19 as shown in FIG. 8 is formed in this way. Directing attention to a positional relationship between the holding member 17 and the scintillator that constitute the detector unit 19, the holding member 17 and the detector array 16 are fixed while the scintillator 2 is placed on the support board 21e. Consequently, the holding member 17 and the scintillator 2 have a uniform relative position in the x-direction in every manufacture of the detector unit 19.

Moreover, the holding member 17 and the detector array 16 are fixed while the detector array 16 is placed on the first jig 21 such that the center line 2h (center reflector) of the scintillator 2 is equal in position in the y-direction to one side 21h of the branch portion 21a. Furthermore, the holding member 17 and the detector array 16 are fixed while the holding member 17 is placed on the first jig 21 such that the marking 17k in the sub member 17b is equal in position in the y-direction to the marking 21k in the base 21b. Considering above, the holding member 17 and the scintillator 2 have a uniform relative position in the y-direction in every manufacture of the detector unit 19. The relative position of the holding member 17 and the scintillator 2 on the first jig 21 is determined collectively in the x and y directions. Thus, the first jig has no concern with the relative position in the z-direction of the holding member 17 and the scintillator 2. However, even when the relative position of the holding member 17 and the detector array 16 in the detector unit 19 deviates in the z-direction, the deviation in the z-direction is corrected by a second jig 22, mentioned later.

<Second Jig Placement Step S5>

Figure 9:
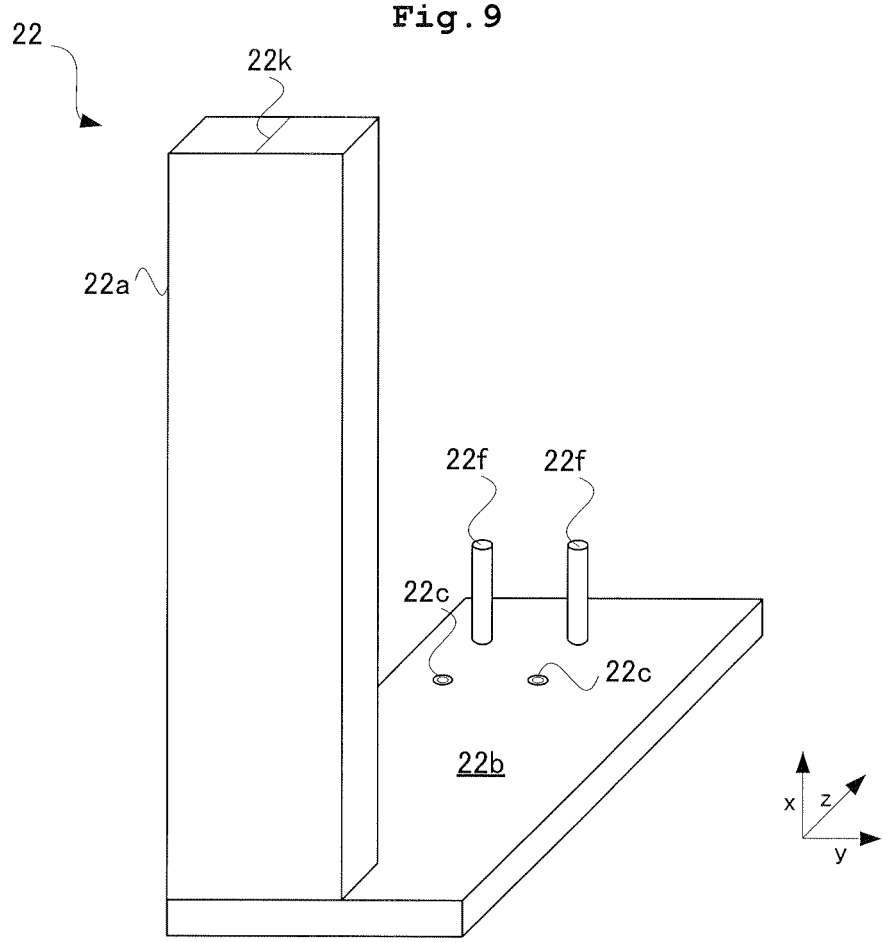
FIG. 9 is a perspective view showing a configuration of a second jig according to Embodiment 1.

Each of the detector units 19 having deviated holding member 17 and detector array 16 in coupling position in the z-direction is fixedly placed on the second jig 22 sequentially for correction of the deviation. The second jig 22 is used in this correction. Firstly, description will be given of a configuration of the second jig 22. FIG. 9 is a perspective view showing a configuration of the second jig 22 according to Embodiment 1. As shown in FIG. 9, the second jig 22 has a planar bottom 22b, and a prismatic stein 22a that extends in the x-direction perpendicular to a plane of the bottom 22b. The bottom 22b is provided with screw holes 22c for fixing the detector unit 19, and two jig pins 22f that extend in the x-direction.

Figure 10:
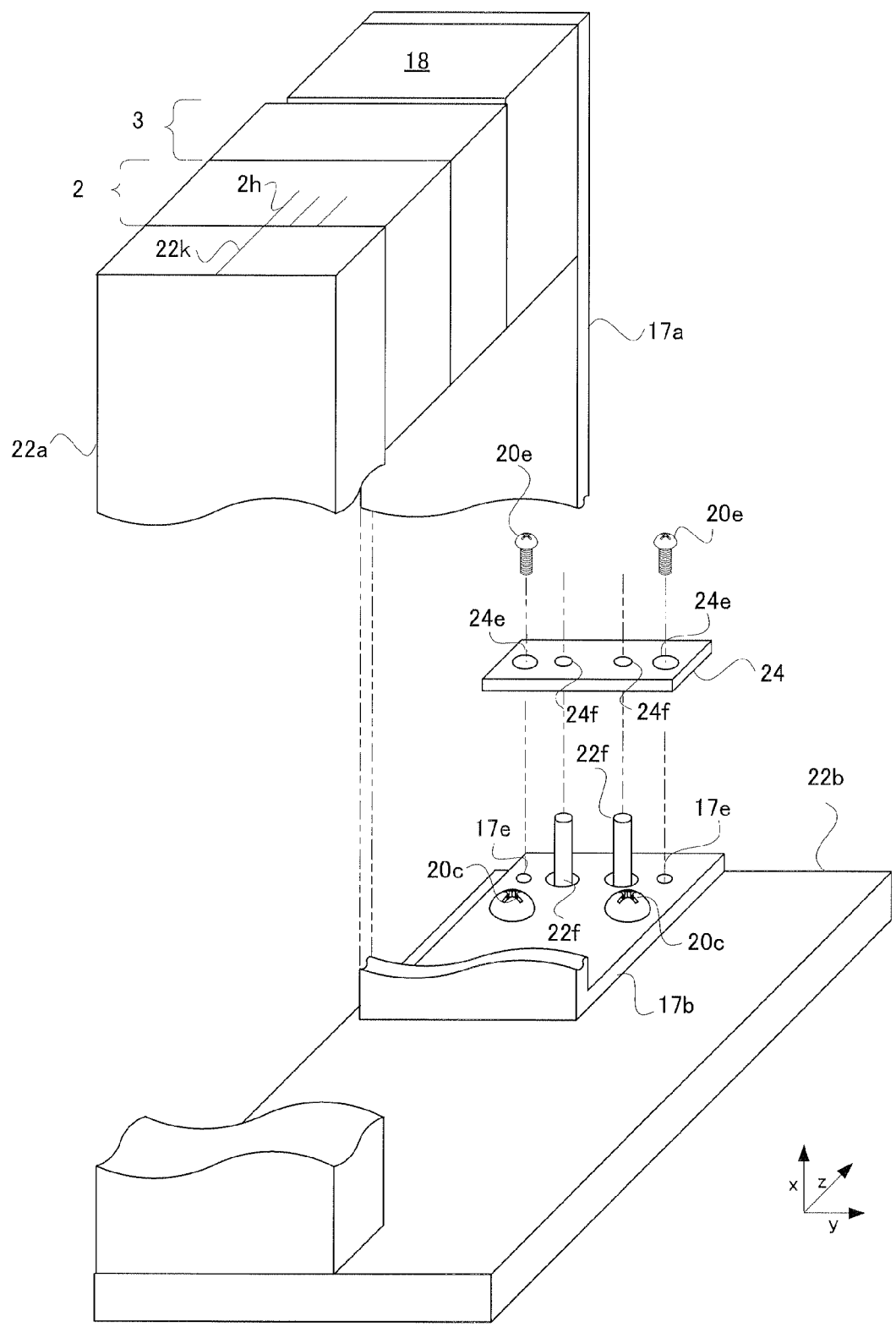
FIG. 10 is a perspective view Showing each step according to Embodiment 1.

Description will be given of operations in the second jig placement step S5. FIG. 10 is a perspective view showing each process according to Embodiment 1. As shown in FIG. 10, the detector unit 19 is fixedly placed on the second jig 22 through contact of the sub member 17b of the holding member 17 to the bottom 22b. At this time, each of the jig pins 22f provided on the bottom 22b is inserted into each of the through holes 17e provided in the sub member 17b. Here, the through hole 17f is set to have an internal diameter sufficiently larger than a diameter of the jig pin 22f. Accordingly, a placement position of the detector unit 19 may be adjusted with respect to the second jig 22. Here, the jig pin 22f passes through the sub member 17b, and is exposed from a surface thereof.

Subsequently, the placement position of the detector unit 19 is adjusted with respect to the second jig 22 for fixation of the detector unit 19 to the second jig 22. Specifically, the screw 20c is inserted through the drilled hole 17c provided in the sub member 17b (see FIG. 6) and screwed into the screw hole 22c provided in the bottom 22b for fixation of the screw 20c under a state where the scintillator 2 of the detector unit 19 contacts the stem 22a of the second jig 22 in the z-direction for determination of the relative position of the detector unit 19 with respect to the second jig 22. As a result, the detector unit 19 is fixed to the second jig 22. The stem 22a has a contact surface to the scintillator 2 with enough width and height to contact an entire incident surface of gamma rays in the scintillator 2. The stem 22a also has a marking 22k at a tip thereof that extends in the y-direction. The marking 22k passes just the middle of the two jig pins 22, assuming that it extends in the z-direction. When the detector unit 19 is fixedly placed on the second jig 22, the screw 20c is screwed while the center line 2h (center reflector) in the detector array 16 in the z-direction is equal in position in the y-direction to the marking 22k of the stem 22a that extends in the y-direction. Of course, at this time, each of the scintillators 2 is in contact with the stem 22a. Here, the center line 2h and the marking 22k correspond to the third positioning device of this invention. In addition, the z-direction corresponds to the direction where the scintillator contacts the stem of this invention, <Plate Fixation Step S6, and Second Jig Removal Step S7>

Subsequently, a plate fixation step S6 is performed for fixing the plate 24 to the sub member 17b. Firstly, description will be given of a configuration of the plate 24 prior to explanation on this step. As shown in FIG. 10, the plate 24 has pin holes 24f through which two jig pins 22f are inserted, and two drilled holes 24e through which screws 20e are inserted for fixing the plate 24 to the sub member 17b. As is shown in FIG. 10, each of the jig pins 22f projecting from the sub member 17b in the x-direction is inserted through each of the pin holes 24f provided in the plate 24. The pin hole 24f has an internal diameter approximately equal to a diameter of the jig pin 22f. Accordingly, the plate 24 is to be accurately positioned with respect to the second jig 22 via the jig pins 22f upon insertion of each of the jig pins 22f through each of the pin holes 24f. Thereafter, the screw 20e passes through the drilled hole 24e to be screwed into the screw hole 17e provided in the sub member 17b. Accordingly, the plate 24 is to be fixed to the sub member 17b. Here, the screw 20e merely integrates the sub member 17b and the plate 24, and is not screwed into the second jig 22. Specifically, the tip of the screw 20e does not reach the bottom 22b of the second jig 22. Here, the jig pin 22f and the pin hole 24f correspond to the fourth positioning device of this invention.

Figure 11:
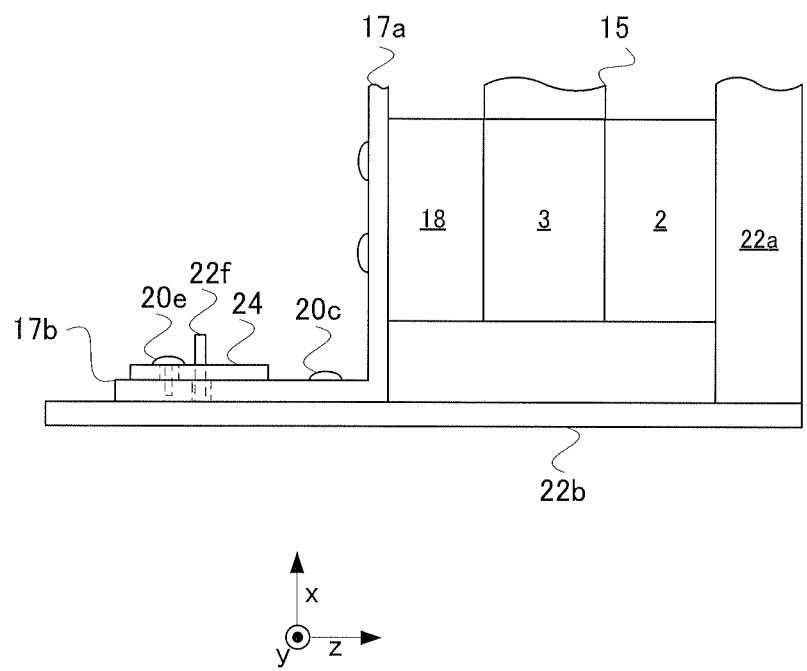
FIG. 11 is a plan view showing each step according to Embodiment 1.

FIG. 11 is a plan view showing each process according to Embodiment 1. As shown in FIG. 11, the jig pin 22f passes through the sub member 17b. Accordingly, the tip of the jig pin 22f is exposed from the sub member 17b, and inserted through the plate 24. On the other hand, the screw 20e fixes the sub member 17b and the plate 24.

Figure 12:
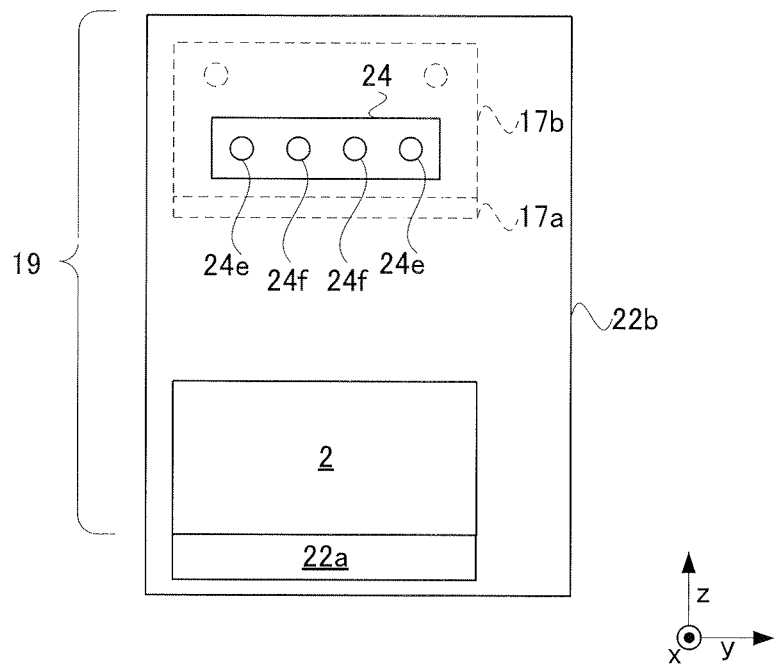
FIG. 12 is a plan view showing a relative position of the plate and the scintillator according to Embodiment 1.

At this time, as shown in FIG. 12, the positional relationship between the stem 22a and the plate 24 is fixed in every manufacture of the detector unit 19. The positional relationship between the stem 22a and the plate 24 in the z-direction is fixed among the detector units 19. The scintillator 2 contacts the stem 22a in the z-direction. Consequently, the positional relationship between the plate 24 and the scintillator 2 in the z-direction is also fixed among, the detector units 19. That is, even when the incident surface of gamma rays in the scintillator 2 and the clearance of the holding member in the z-direction deviate, a position where the plate 24 is fixed to the sub member 17b is determined via only the jig pin 22f with no influence of the deviation. Accordingly, even when the position of the holding member 17 shown in FIG. 10 by dotted lines and the stem 22a varies in every detector unit 19 to be formed, each positional relationship among the bottom 22b, the stem 22a, the scintillator 2, and the plate 24 is fixed among the detector units 19 to be formed.

In the second jig removal step S7, the screw 20c is screwed out from the sub member 17b (see FIG. 10.) In so doing, the detector unit 19 after fixation of the plate 24 is removed from the second jig 22. Here in comparison of each detector unit 19, the relative position of the plate 24 and the scintillator 2 is uniform in the y and z directions. Specifically, the uniform relative position in the z-direction is realized through contact of each scintillator 2 to the stem 22a. The uniform relative position in the y-direction is realized through conformity of the center reflector in the scintillator 2 and the marking 22k in the stem 22a in the y-direction.

<Group of Detectors Formation Step S8>

Figure 13:
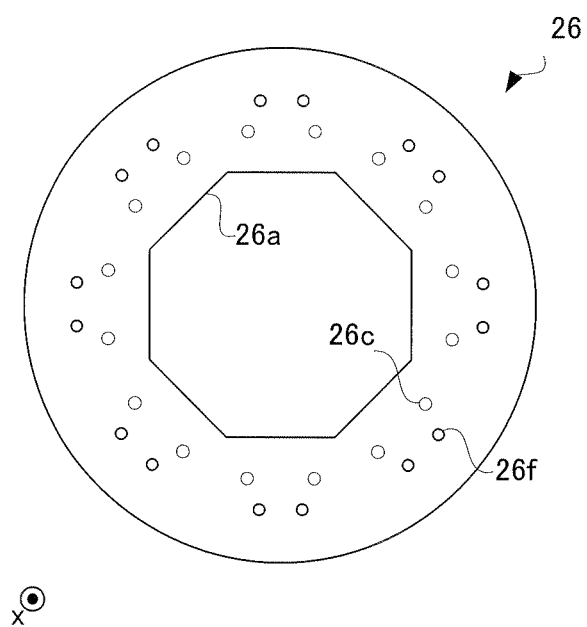
FIG. 13 is a perspective view showing a configuration of a circular plate according to Embodiment 1.

Finally, the detector units 19 are annularly arranged to form the group of detectors. Specifically, eight sub members 17b of the detector units 19 contact a circular plate 26 having an octagonal opening 26a and both members 19 and 26 are fixed via bolts, whereby the group of detectors 12 is formed. Description will be given of a configuration of the circular plate 26 prior to explanation on this step. As shown in FIG. 13, the circular plate 26 according to Embodiment 1 has an octagonal opening 26a at a center thereof and eight pairs of reference pins 26f or total sixteen pins that extend in the x-direction so as to surround the opening 26a. Upon arrangement of the detector units 19 on the circular plate 26, the reference pins 26f are inserted through the pin holes 24f in the plate 24 for alignment of the detector units 19 with respect to the circular plate. In addition, eight pairs of drilled holes 26c or total sixteen holes through which bolts are inserted for fixing both members 19 and 26 are also provided so as to surround the opening 26a. Here, the reference pin 26f and the pin hole 24f provided in the plate correspond to the fifth positioning device of this invention. Moreover, the circular plate 26 corresponds to the base member of this invention.

Figure 14:
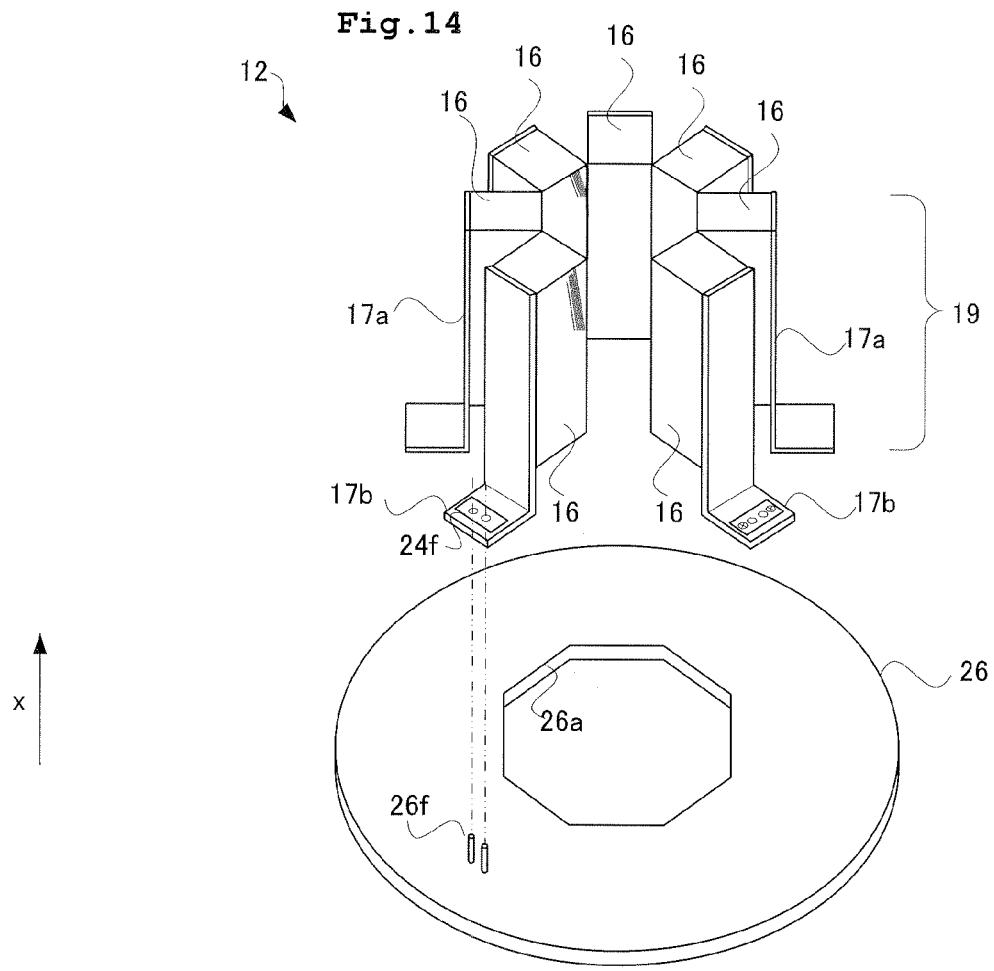
FIG. 14 is a perspective view showing a group of detectors formation step according to Embodiment 1.

FIG. 14 is a perspective view showing a group of detectors formation step according to Embodiment 1. As shown in FIG. 14, a bolt passes through the drilled hole provided in the sub member 17b and the drilled hole 26c provided in the circular plate 26 collectively while the reference pin 26f passes through the pin hole 24f. Thereafter, both members 19 and 26 are fixed by screwing the bolt on the corresponding nut. Each of the reference pins 26f are arranged accurately so as to surround the opening 26a annularly. Accordingly, eight plates 24 are to be arranged on the circular plate 26 accurately in an annular shape. Taking into consideration that the plate 24 and the scintillator 2 are relatively arranged uniformly in each detector unit 19, the scintillator 2 is arranged accurately on the circular plate 26 in an annular shape. Here in FIG. 14, a detector unit 19 on the most front side in the drawing is omitted. Actually, detector units 19 are annularly arranged.

Figure 15:
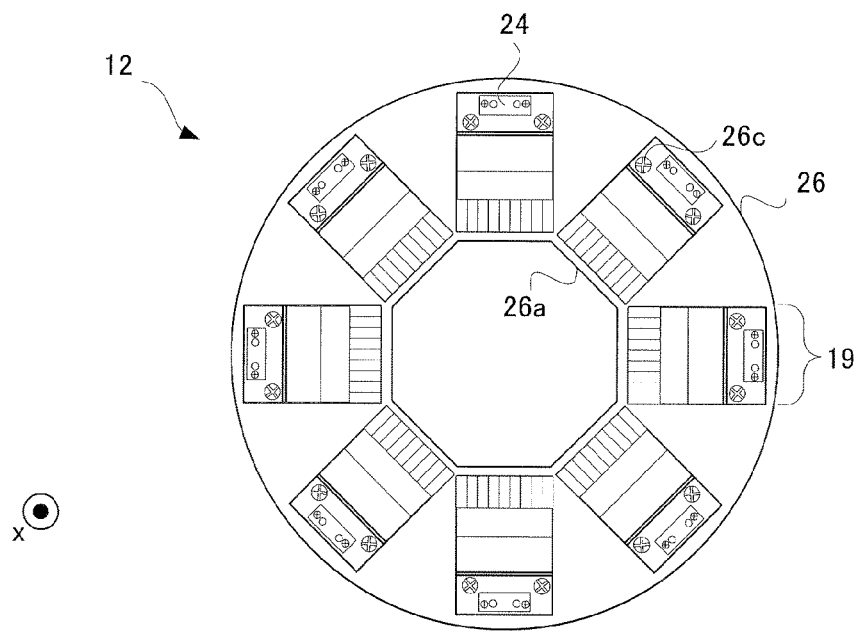
FIG. 15 is a plan view showing a configuration of the group of detectors according to Embodiment 1.
Figure 19:
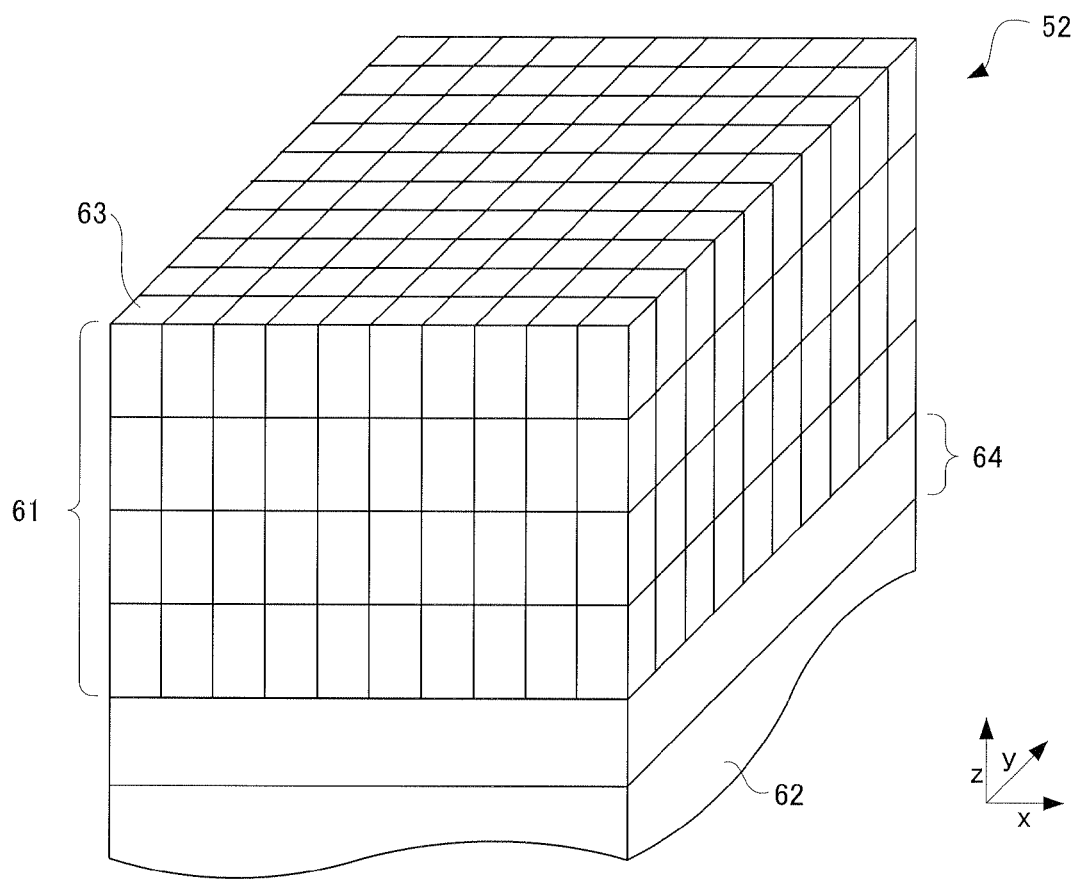
FIG. 19 is a perspective view showing a configuration of conventional radiation tomography apparatus.

FIG. 15 is a plan view showing a configuration of the group of detectors according to Embodiment 1. In this way, the group of detectors 12 according to Embodiment 1 is to be formed. A gantry cover is attached thereto, and the radiation tomography apparatus 10 according to Embodiment 1 is accomplished.

As noted above, the configuration according to Embodiment 1 may realize relative positioning of the detector array 16 and the holding member 17 via the first jig 21. That is because the first jig 21 has a support board 21e for supporting the scintillator 2 that ensures a given relative position of the detector array 16 and the holding member 17 in a long side direction of the detector array 16. Moreover, the first jig 21 may simultaneously determine a relative positional relationship between the detector array 16 and the holding member 17 in a short side direction of the detector array 16. As noted above, the first jig 21 determines the relative position of the detector array 16 and the holding member 17 collectively in the x and y directions that are perpendicular to each other.

In addition, according to the configuration of Embodiment 1, positional deviation of the detector array 16 and the holding member 17 in the z-direction is corrected through fixation of the plate 24 by use of the second jig 22 upon formation of the detector unit 19. Specifically, the detector array 16 and the holding member 17 are integrated with each other, and thereafter, the plate 24 is fixed to the holding member 17 that is used as a reference of a fixing position of the detector unit 19 to the circular plate 26. The fixing position of the plate 24 to the holding member 17 is independent of the fixing position of the detector array 16 to the holding member 17. Accordingly, even when both members 16 and 17 deviate together in the z-direction, upon arrangement of the detector unit 19 on the circular plate 26, the detector arrays 16 are naturally to be arranged in an annular shape merely by arranging the plates 24 in an annular shape accurately. As noted above, according to the configuration of Embodiment 1, the radiation detectors 1 that constitute the group of detectors 12 may be arranged more regularly. Therefore, decrease in spatial resolution may be suppressed as much as possible that occurs from arrangement deviation of the radiation detectors 1 in the group of detectors 12 upon counting the number of annihilation gamma-ray pairs to determine the radiation intensity distribution.

The detector array 16 and the holding member 17 according to Embodiment 1 are adjusted in relative positional relationship with three positioning methods that are independent to one another. Specifically, the methods are those using the support board 21e, the markings 17k, 21k, the center line 2h and one side 21h of the branch portion 21a, and the plate 24. Such configuration may realize assignment of these positioning methods to three directions of x, y, and z directions, respectively, that are perpendicular to one another. Specifically, the support board 21e performs adjustment in the x-direction, the markings 17k, 21k, the center line 2h and one side 21h of the branch portion in the y-direction, and the plate 24 in the z direction. In other words, the relative positional relationship of the detector array 16 and the holding member 17 according to Embodiment 1 may be adjusted in all of the x, y, and z directions that are perpendicularly to one another. Consequently, no direction exists where the detector array 16 and the holding member 17 may be coupled with deviating from each other.

This invention is not limited to the foregoing configurations, but may be modified as follows:

(1) The foregoing Embodiment has the second jig 22, but does not need to have this. According to this modification, the plate 24 is not always needed. In this case, jig pins 21f may be provided on the first jig 21 as shown in FIG. 16(a). On the other hand, the holding member 17 has pin holes 17p provided therein through which the jig pins 21f are directly inserted, as shown in FIG. 16(b). Such configuration may realize determination in position of the detector arrays 16 with respect to the holding member 17 in the x and y directions. In the second holding member fixation step S4, the deviation in position of the detector array 16 and the holding member 17 in the z-direction does not sometimes leads to a significant problem. That is, this modification is directed to this, and may realize provision of the method for manufacturing the radiation tomography apparatus having suppressed steps in number in which the second jig 22 is not always needed. Specifically, according to this modification, the steps may be omitted as for the second jig 22 and the plate 24 of the configuration in Embodiment 1. Here, the jig pin 21f and the pin hole 17f correspond to the sixth positioning device of this invention. In addition, the reference pin 26f and the pin hole 17f correspond to the seventh positioning device of this invention again.

(2) The detector ring in the foregoing Embodiment is O-shaped. A group of radiation detectors of C-shaped may be placed instead. Specifically, as shown in FIG. 17, a bottom plate may be a C-shaped fractured ring. The fractured ring 12a may be provided, instead of the ring-shaped group of detectors 12, having detector units 16 arranged circularly. AC-shaped plate 26b may be provided, instead of the circular 26, along an arc of the fractured ring 12a. Here, the gantry 11 and the circular plate according to this modification is of C-shape corresponding to the shape of the fracture ring 12a.

(3) In the foregoing embodiment, the scintillation counter crystal is composed of LYSO. Alternatively, the scintillation counter crystal may be composed of another materials, such as GSO ($Gd_2SiO_5$), may be used in this invention. With this modification, the radiation tomography apparatus may be provided having suppressed manufacturing cost.

(4) In the foregoing embodiment, the scintillator 2 has four scintillation counter crystal layers. This invention is not limited to this embodiment. For instance, the scintillator formed of one scintillation counter crystal layer may be applied to this invention. Moreover, the scintillation counter crystal layer may be freely adjusted in number depending on applications of the radiation tomography apparatus.

(5) The fluorescence detector in the foregoing embodiment is formed of the photomultiplier tube. This invention is not limited to this embodiment. A photodiode or an avalanche photodiode, etc. may be used instead of the photomultiplier tube.

(6) In the foregoing embodiment, the holding member 17 and the bleeder unit 18 are screwed for integration. This invention is not limited to this embodiment. The holding member 17 and the bleeder unit 18 may be integrated via an adhesive.

(7) In the foregoing embodiment, the jig pin 22f is provided in the second jig 22, the pin hole 24f in the plate 24, and the reference pin 26f in the circular plate 26. This invention is not limited to this embodiment. The pin hole may be provided in the second jig 22 and the circular plate 24, and the pin may be provided in the plate 24.

INDUSTRIAL UTILITY

As described above, this invention is suitable for radiation tomography apparatus for case in medical fields.

The invention claimed is:

1. A method of manufacturing radiation tomography apparatus having a group of detectors in an annular shape, the group of detectors having detector arrays in a ring shape with each of radiation detectors arranged in series in which a scintillator that converts radiation into fluorescence, a light guide that receives fluorescence, and a light detector that detects fluorescence are laminated in a height direction, comprising:

a detector array formation step of forming a detector array having two or more radiation detectors integrated with one another;

a first holding member fixation step of fixing a sub member of a holding member, the holding member having a main member and the sub member, the sub member extending from the main member to a base of a first jig, the first jig also having a branch portion and a supporting device, the branch portion of the first jig extending from the base of the first jig;

a detector array placement step of placing the detector array on the first jig by inserting the detecting array into a position between the branch portion and the main member;

a second holding member fixation step of fixing the detector array to the holding member by adjusting relative positions of the detector array and the holding member with respect to the base by spacing the scintillator apart from the base through contact of the scintillator of the detector array to the supporting device; and a group of detectors formation step of forming the group of detectors by fixing the sub member to a base member to arrange the detector arrays at least in a circular shape.

2. The method of manufacturing the radiation tomography apparatus according to claim 1, wherein the base of the first jig and the sub member have a first positioning device provided therein;

a relative position is determined of the holding member with respect to the first jig in a given direction via the first positioning device in the first holding member fixation step; and the branch portion of the first jig and the scintillator has a second positioning device, and a relative position is determined of the detector array with respect to the first jig in a given direction via the second positioning device in the second holding member fixation step, whereby a relative positional relationship between the holding member and the detector array in a given direction is determined via the first jig.

3. The method of manufacturing the radiation tomography apparatus according to claim 1, further comprising:

a second jig placement step of placing the holding member on a bottom by contacting the scintillator of the detector array to a stem of a second jig having the bottom and the stem extending therefrom, thereby adjusting a relative position of the second jig and the detector array in a direction where the scintillator and the stem contact to each other; and a plate fixation step of fixing a plate to the sub member while adjusting the relative position in a given direction of the detector array with respect to the stem with a third positioning device provided in the stein of the second jig and the scintillator, wherein in the group of detectors formation step, the detector arrays with respect to the base member are adjusted in position based on a position of the plate, and are arranged at least circularly.

4. The method of manufacturing the radiation tomography apparatus according to claim 3, wherein a fourth positioning device is provided in the bottom of the second jig and the plate, and a relative position of the plate with respect to the sub member in the plate fixation step is determined via the fourth positioning device.

5. The method of manufacturing the radiation tomography apparatus according to claim 3, wherein a fifth positioning device is provided in the base member and the plate, and a relative position of the detector array with respect to the base member in the group of detectors formation step is determined via the fifth positioning device.

6. The method of manufacturing the radiation tomography apparatus according to claim 2, wherein a sixth positioning device is provided in the base of the first jig and the sub member, a seventh positioning device is provided in the base member and the sub member, the relative position of the detector array with respect to the holding member in the second holding member fixation step is determined through contact of the scintillator of the detector array to the branch portion and the supporting device and via the sixth positioning device, and the relative position of the detector array with respect to the base member in the group of detectors formation step is determined via the seventh positioning device.

7. The method of manufacturing the radiation tomography apparatus according to claim 2, further comprising:

a second jig placement step of placing the holding member on a bottom by contacting the scintillator of the detector array to a stem of a second jig having the bottom and the stem extending therefrom, thereby adjusting a relative position of the second jig and the detector array in a direction where the scintillator and the stem contact to each other; and a plate fixation step of fixing a plate to the sub member while adjusting the relative position in a given direction of the detector array with respect to the stem with a third positioning device provided in the stem of the second jig and the scintillator, wherein in the group of detectors formation step, the detector arrays with respect to the base member are adjusted in position based on a position of the plate, and are arranged at least circularly.

8. The method of manufacturing the radiation tomography apparatus according to claim 4, wherein a fifth positioning device is provided in the base member and the plate, and a relative position of the detector array with respect to the base member in the group of detectors formation step is determined via the fifth positioning device.

* * * * *